United States Patent
Liang et al.

(10) Patent No.: US 9,459,790 B2
(45) Date of Patent: Oct. 4, 2016

(54) METHOD AND APPARATUS FOR CONTROLLING DOT RENDERING ON A TOUCH SCREEN

(75) Inventors: Mao Liang, Beijing (CN); Mingjun Zhang, Beijing (CN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 15 days.

(21) Appl. No.: 13/411,851

(22) Filed: Mar. 5, 2012

(65) Prior Publication Data

US 2013/0229360 A1    Sep. 5, 2013

(51) Int. Cl.
*G06F 3/0488*    (2013.01)
(52) U.S. Cl.
CPC ................................ *G06F 3/04883* (2013.01)
(58) Field of Classification Search
None
See application file for complete search history.

(56) References Cited

U.S. PATENT DOCUMENTS

| | | |
|---|---|---|
| 5,635,683 A | 6/1997 | McDermott et al. |
| 7,696,980 B1 | 4/2010 | Piot et al. |
| 2008/0180410 A1 | 7/2008 | McCall et al. |
| 2008/0211785 A1* | 9/2008 | Hotelling et al. ............ 345/173 |
| 2009/0135140 A1 | 5/2009 | Constantin et al. |
| 2011/0050588 A1* | 3/2011 | Li et al. ........................ 345/173 |
| 2011/0304643 A1 | 12/2011 | Marison |
| 2012/0274591 A1 | 11/2012 | Rimas-Ribikauskas et al. |
| 2013/0009884 A1 | 1/2013 | Wang et al. |
| 2013/0120426 A1 | 5/2013 | DiVerdi et al. |
| 2013/0221993 A1 | 8/2013 | Ksondzyk et al. |
| 2014/0145994 A1 | 5/2014 | Burrough et al. |

* cited by examiner

*Primary Examiner* — David D Davis
(74) *Attorney, Agent, or Firm* — Keller Jolley Preece (57) ABSTRACT

A method and apparatus for controlling dot rendering for a touch screen. The method and apparatus receives indicia of pressure on the touch screen, where the pressure indicia represents an amount of force applied to the touch screen. From the indicia, the method and apparatus computes a dot size and renders a dot having the computed dot size on the touch screen.

18 Claims, 4 Drawing Sheets

NO SMOOTHING

FIG. 3A

SMOOTHING

METHOD AND APPARATUS FOR CONTROLLING DOT RENDERING ON A TOUCH SCREEN

BACKGROUND OF THE INVENTION

1. Field of the Invention

Embodiments of the present invention generally relate to touch screen displays and, more particularly, to a method and apparatus for controlling dot rendering on a touch screen.

2. Description of the Related Art

In general, drawing applications for touch screen tablet computing devices utilize operating systems of the devices on which the applications are installed and executed to render strokes on a display of the tablet. The touch screen tablet computing devices may utilize fingers or stylus among other pointing devices for entering a dot at a point of contact of the pointing device. As the pointing device is moved, the repeated creation of the dot forms a stroke on the touch screen.

One problem with the use of conventional drawing applications is that the dimensions of a dot rendered using these applications remains constant for the entire stroke. For example, when drawing a stroke, users first establish a dot size (i.e., equivalent to a line width) unless the default width setting is used. The dot size cannot be altered during a stroke. Most state of the art solutions tend to solve the problem of fixed dot size by allowing a user to sequentially select different line widths to define each stroke that forms a larger stroke. As such, a stroke of varying width is painstakingly created by drawing a series of small strokes, each having a different selected width.

Therefore, there is a need in the art for a method and apparatus for controlling dot rendering on a touch screen while creating a stroke.

SUMMARY OF THE INVENTION

Embodiments of the invention comprise a method and apparatus for controlling dot rendering for a touch screen. The method and apparatus receives indicia of pressure on the touch screen, where the pressure indicia represents an amount of force applied to the touch screen. From the indicia, the method and apparatus computes a dot size and renders a dot having the computed dot size on the touch screen.

While the method and apparatus is described herein by way of example for several embodiments and illustrative drawings, those skilled in the art will recognize that the method and apparatus for controlling display rendering for a touch screen is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for controlling display rendering for a touch screen defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention generally relate to a method and apparatus for controlling dot rendering for a touch screen computer (e.g., tablet computer such as iPhone®, iPad®, XOOM, and the like). Embodiments of the present invention specifically relate to a method and apparatus for controlling dot size using indicia of pressure on a touch screen. When a user touches a touch screen, the operating system generates touch event. A rendering controller reads the touch event to access an indicia of pressure (e.g., data or signal representing pressure) therefrom and computes dot size based on the indicia. As a stroke is formed, the rendering controller monitors the pressure indicia and dynamically adjusts the dot size (stoke width) as the pressure indicia changes.

Various embodiments of a method and apparatus for controlling dot rendering for a touch screen are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
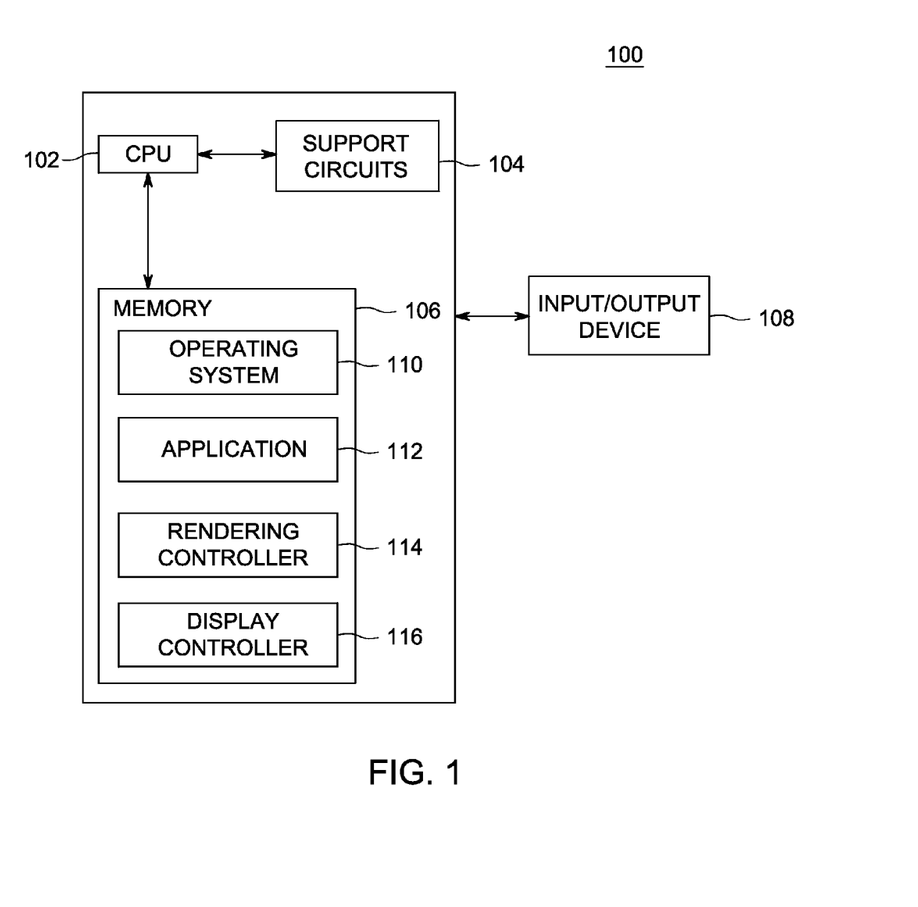
FIG. 1 depicts a block diagram of a tablet computer for controlling display rendering according to one or more embodiments.

FIG. 1 depicts a block diagram of a tablet computer 100 (hereinafter tablet 100) for controlling dot rendering, according to one or more embodiments. For example, in one or more specific embodiments, the tablet 100 is a type of computing device selected from a group comprising a tablet Personal Digital Assistant (or PDA), tablet PC, post-PC tablet, mobile computer, graphics tablet and/or the like. Such tablets include iPad®, iPhone®, XOOM, and the like.

The tablet 100 comprises a Central Processing Unit (or CPU) 102, support circuits 104, a memory 106 and an I/O device 108. The CPU 102 may comprise one or more commercially available microprocessors or microcontrollers that facilitate data processing and storage. The various support circuits 104 facilitate the operation of the CPU 102 and include one or more clock circuits, power supplies, cache, input/output circuits, and the like. The memory 106 comprises at least one of Read Only Memory (ROM), Random Access Memory (RAM), disk drive storage, optical storage, removable storage and/or the like. The memory 106 comprises an Operating System (OS) 110, an application 112, a rendering controller 114 and a display controller 116.

The application 112 comprises at least one of graphics software or drawing programs such as a vector touch screen drawing program. By way of example, and in no way limiting the scope of the invention, the application 112 is ADOBE® IDEAS available from ADOBE Systems Inc. of San Jose, Calif. In other embodiments, the drawing program may be a portion of a larger multipurpose application. Embodiments of the invention find use with any application that renders dots and/or strokes on a touch screen.

The application 112 facilitates performance of drawing operations using the input/output device 108 of the tablet 100. In one embodiment, the input/output device 108 is a pressure based or pressure sensitive input/output device. By way of example, and in no way limiting the scope of the invention, the input/output device 108 comprises a touch screen whereupon, contact of a finger or stylus creates a change in the display (e.g., render a dot of pixels) and dragging the finger or stylus across the touch screen forms a stroke. Embodiments of the present invention control a width of dots and strokes. Touch screen technology that may utilize the invention include capacitive touch screens, resistive touch screens, surface acoustic wave touch screens, and the like. Embodiments of the invention find use in relation to any touch screen technology that produces a pressure indicia representing an amount of force placed on the screen at a particular location when an object (e.g., finger(s), stylus, and/or the like) is in contact with the screen. Herein, the input/output device 108 has the ability to produce the pressure indicia either directly or after processing by the CPU 102 and/or one or more other circuits forming part of the support circuits 104.

A user touches or develops contact with the input/output device 108. The input/output device 108 detects the location of touch within a given display area therein. The input/output device 108 registers the location of the touch or contact, subsequent to detection, in the memory 106.

The OS 110 may comprise various commercially known operating systems divided in at least a pair of classes, namely traditional desktop-based operating systems and post-PC mobile-based (or phone-like) operating systems. For the former class, popular OS's are MICROSOFT WINDOWS, Mac OS and a range of LINUX variations. In the latter class, the popular variants include APPLE IOS, and GOOGLE ANDROID®.

In specific embodiments of the invention, the OS 110 comprises the rendering controller 114. In general, web browsers running on modern, touch-enabled (or -sensitive) devices have one or more touch events, such as "touchstart," "touchend," "touchenter," "touchleave," "touchmove" and "touchcancel". APPLE's IOS and GOOGLE's ANDROID are two examples of mobile operating systems with support for these events in their web browsers.

The OS 110 generates a touch event in response to a user touching input/output device 108. The OS 110 repeatedly generates a plurality of touch events in response to movement of a finger or stylus across the input/output device 108 using at least one of finger and stylus. In one embodiment, the rendering controller 114 resides in the OS 110 between the application 112 and the display controller 116. In certain embodiments, the rendering controller 114 is at least one of a component of, a plug in and an extension for, the operating system.

The rendering controller 114 launches each time in response to generation of a touch event by the OS 110 as the user touches the input/output device 108. The rendering controller 114 receives an indicia of pressure from the touch event generated by the OS 110. Specifically, the rendering controller 114 reads, i.e., accesses and retrieves, the indicia of pressure from the touch event generated by the OS 110.

In one embodiment, the touch event is a MotionEvent. In ANDROID, the MotionEvent class represents the movement events generated when users touch the touch screen. The MotionEvent class may hold either absolute or relative movements, depending on usage thereof. The MotionEvent is an object of the MotionEvent class. The MotionEvent object is used to report movement events including, but not limited to, stylus or finger movement events. The MotionEvent object may hold either absolute, relative movements, or other data, depending on the type of device. The MotionEvent object describes movements in terms of an action code and a set of axis values. The action code specifies the state change that occurred, such as a pointer going down or up. The axis values describe the position and other movement properties. For example, when the user first touches the screen, the system delivers a touch event to the appropriate view with the action code ACTION_DOWN and a set of axis values that include the X and Y coordinates of the touch and information about the pressure, size and orientation of the contact area. In addition, of note is the fact that the pressure information is in the MotionEvent. For example, the method or function android.view.MotionEvent.getPressure(int pointerIndex) returns the current pressure of a given event for a given pointer index. The pressure generally ranges from a minimum of 0 (no pressure at all) to a maximum of 1 (normal pressure); however, values higher than 1 may be generated depending on the calibration of the input/output device 108.

The rendering controller 114 reads the touch event for the corresponding pressure indicia. The pressure information is available from the touch event, such as the MotionEvent generated by the ANDROID 3.1 OS. The rendering controller 114 acquires the pressure information from one or more APIs of the tablet 100. For example, on MOTOROLA XOOM tablet computer the pressure information is acquired from the APIs of ANDROID 3.1 OS.

The rendering controller 114 computes a current dot size based on the pressure indicia. For example, and in no way limiting the scope of the invention, a plurality of quantitative parameters in connection with the dot size and corresponding pressure thereof includes a first pair of predefined constants, namely a minimum and a maximum dot size, i.e., MINDOTSIZE and MAXDOTSIZE, and a second pair of predefined constants corresponding to the first pair of predefined constants, namely a minimum and a maximum pressure thereof, i.e., MINPRESSURE and MAXPRESSURE, a dependent variable, namely a current dot size, i.e., CURRENTDOTSIZE, and an independent variable, namely a current pressure, i.e., CURRENTPRESSURE.

The rendering controller 114 develops and implements the following mathematical equation represented by Expression 1 below:

CURRENTDOTSIZE=MINDOTSIZE+(CURRENT-
PRESSURE−MINPRESSURE)*MAXDOT-
SIZE/MAXPRESSURE     (1)

Wherein the terms MINDOTSIZE, MAXDOTSIZE, MINPRESSURE and MAXPRESSURE are predefined constants with distinct values thereof in connection with minimum and maximum dot size and corresponding minimum and maximum pressure thereof, respectively.

In accordance with the Expression 1, the rendering controller 114 computes the CURRENTDOTSIZE as a summation of the MINDOTSIZE and the change in the dot size corresponding to change in the pressure. The change in pressure is calculated as a difference in the current pressure and the minimum pressure, i.e. (CURRENTPRESSURE−MINPRESSURE), multiplied by the ratio of the MAXDOTSIZE is to the MAXPRESSURE, i.e. MAXDOTSIZE/MAXPRESSURE.

The rendering controller 114 optionally applies smoothing effects thereby facilitating line smoothing in lines comprising heterogeneous or altering dot size. By way of example, and in no way limiting the scope of the invention, the rendering controller 114 implements the smoothing algorithm comprising the following code snippet:

```
int xchange = abs (toPoint.x - fromPoint.x); /* wherein the xchange is the
change in the value of X-coordinate of a given point or dot in a two-
(or 2)-dimensional coordinate system, and wherein the toPoint.x and
fromPoint.x refer to terminal and initial points or dots of a given line
segment*/
int ychange = abs (toPoint.y - fromPoint.y); /*wherein the ychange is the
change in the value of Y-coordinate of a given point or dot in a two-
(or 2)-dimensional coordinate system, and wherein the toPoint.y and
fromPoint.y refer to terminal and initial points or dots of a given line
segment*/
int loop = xchange > ychange ? xchange : ychange;
double incS = (NEWDOTSIZE - CURRENTDOTSIZE) / loop; /*wherein
the incS is the unit change in dot size and is directly proportional to
change in the dot size from the current dot size to the new dot size, and
is inversely proportional to value of the loop*/
double incX = (toPoint.x - fromPoint.x) / loop; /*wherein the incX is the
unit change in X-coordinate and is directly proportional to change in the
```

```
value of the X-coordinate from the toPoint.x to the fromPoint.x, and
is inversely proportional to value of the loop*/
double incY = (to toPoint.y - fromPoint.y) / loop; /*wherein the incY is
the unit change in Y-coordinate and is directly proportional to change in
the value of the Y-coordinate from the toPoint.y to the fromPoint.y, and
is inversely proportional to value of the loop*/
Path path = new Path( );
Path.moveTo (fromPoint.x, fromPoint.y);
for (int i = 0; i < loop; i ++)
{
    double dotSize = CURRENTDOTSIZE + incS * i;
    paint.setStrokeWidth (dotSize);
    double dx = fromPoint.x + i * incX;
    double dy = fromPoint.y + i * incY;
    path.lineTo (dx, dy);
    canvas.drawPath (path, paint);
    path.reset ( );
    path.moveTo (dx, dy);
}
```

The display controller receives the currently computed dot size, i.e. CURRENTDOTSIZE, from the rendering controller 114 and renders the CURRENTDOTSIZE on the input/output device 108.

Figure 2:
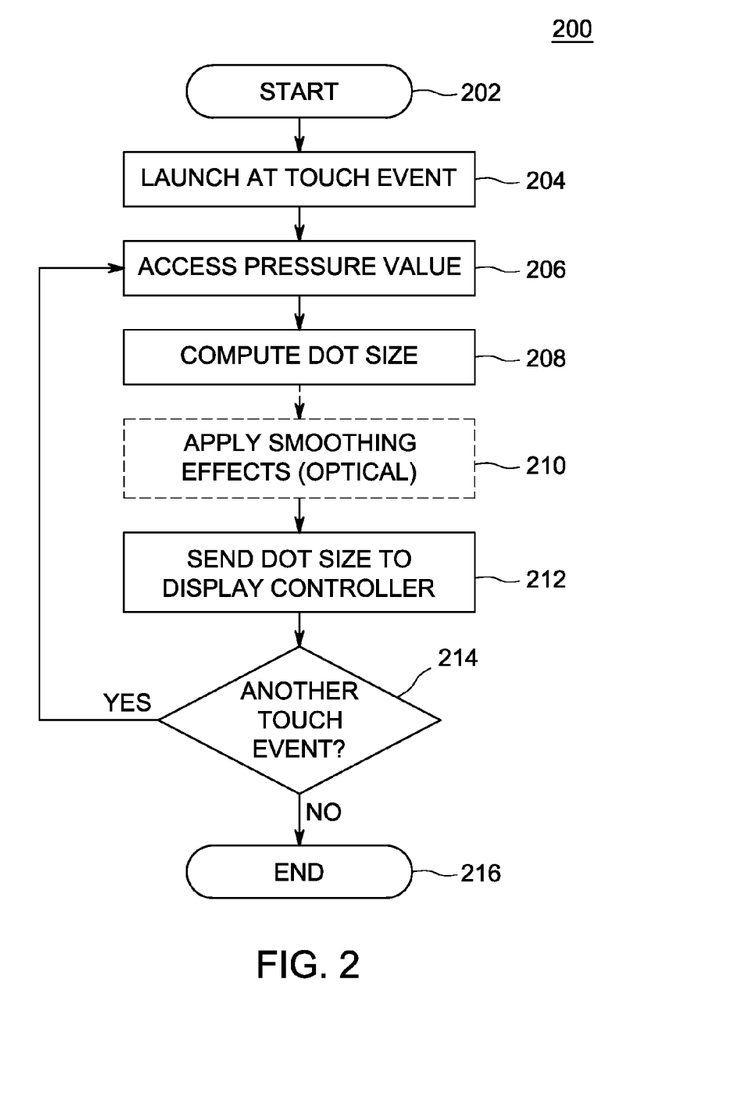
FIG. 2 depicts a flow diagram of a method for controlling dot rendering as performed by a rendering controller of FIG. 1, according to one or more embodiments.

FIG. 2 is a flow diagram of a method 200 for controlling stroke rendering for the input/output device 108 as performed by the rendering controller 114 of FIG. 1, according to one or more embodiments. The method 200 represents execution of at least a portion of the rendering controller 114 of the tablet 100 of FIG. 1, or through deployment of the computer system 500 of FIG. 5, according to an embodiment of the invention.

The method 200 starts at step 202, and proceeds to step 204.

At step 204, the method 200 launches the rendering controller 114 in response to generation of a touch event by the OS 110. The touch event is generated by the OS 110 upon detection of a user contact with the input/output device 108. For example, and by no way of limitation, the touch event is generated as a finger or stylus is moved across the input/output device 108 Upon contact with the input/output device the input/output device 108 registers the location of the touch or contact subsequent to the contact detection. At step 206, the method 200 accesses the touch event for the corresponding pressure indicia. More specifically, the method 200 acquires the pressure information from one or more APIs of the tablet 100. For example, on MOTOROLA XOOM the pressure information is acquired from the APIs of Android 3.1. Specifically of note is the fact that the touch event is a MotionEvent as described above.

At step 208, the method 200 computes the dot size. By way of example, and in no way limiting the scope of the invention, the method 200 computes the dot size using the mathematical equation represented by the Expression 1.

Optionally, at step 210, the method 200 applies smoothing effects thereby facilitating line smoothing in lines comprising heterogeneous or altering dot size that forms a stroke.

By way of example, and in no way limiting the scope of the invention, the method 200 uses the smoothing algorithm comprising the code snippet, described above.

At step 212, the method 200 sends the currently computed dot size to the display controller 116.

At step 214, the method 200 detects the generation or occurrence of another touch event by the OS 110 in response to another user contact with the input/output device 108 or a continued contact with the input/output device.

If the query at step 214 is affirmatively answered, the method 200 precedes to step 206 and repeats the steps 208-214. If the finger or stylus is being dragged across the input/output device, the method 200 loops through steps 206-214 to repeatedly render dots to form a stroke having a width of a computer dot size.

If at step 214, the query is negatively answered, the method 200 proceeds to step 216 and ends.

Figure 3A:
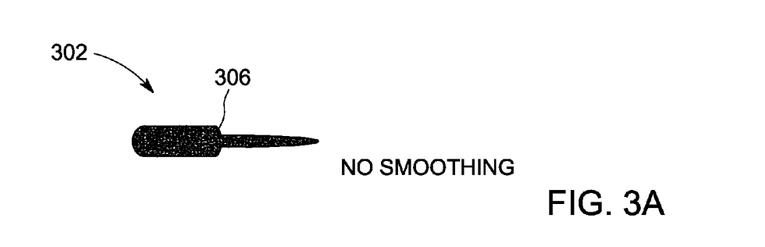
FIGS. 3A-B respectively depict representations of uneven and smooth strokes created by the rendering controller of FIG. 1, according to one or more embodiments.
Figure 3B:
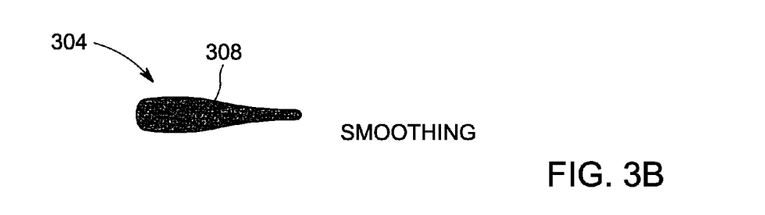

FIG. 3A depicts a representation of an uneven stroke 302 created without using the smoothing algorithm and FIG. 3B depicts a representation of a smooth stroke 304 created while using the 304 smoothing algorithm, according to one or more embodiments.

In certain use case scenarios, as shown in FIG. 3A, an uneven line 300 comprises a plurality of dots. The change in dot size, is proportional to, the change in pressure. More specifically, owing to rapid change in applied pressure (e.g., less pressure), the dot size changes rapidly at location 306 causing an uneven representation of the stroke.

In contrast, in certain use case scenarios, as shown in FIG. 3B, a smooth stroke 304 is obtained using the smoothing algorithm. The smooth stroke 304 comprises at least a plurality of dots that transition smoothly in region 308.

Figure 4:
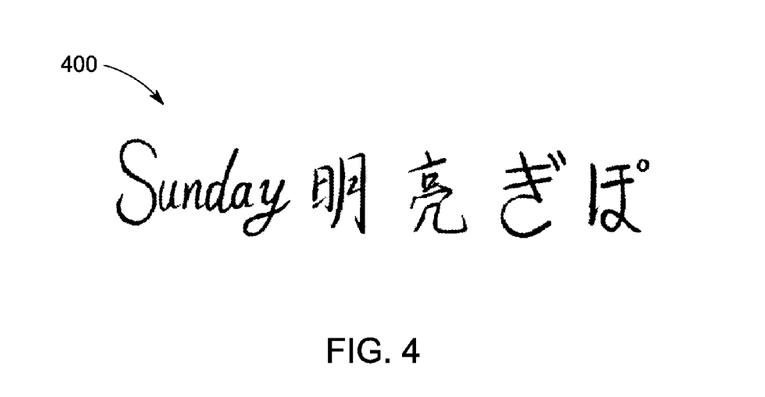
FIG. 4 depicts one or more words as written using fingers on the tablet computer of FIG. 1.

FIG. 4 depicts words and characters 400 that are written using fingers on the tablet 100. To render the strokes in FIG. 4, the smoothing algorithm was used. The strokes width is pressure sensitive to provide characters that look like characters drawn with pen and ink on paper.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

FIG. 4 depicts one or more words that are written using fingers on the tablet 100.

Example Computer System

Figure 5:
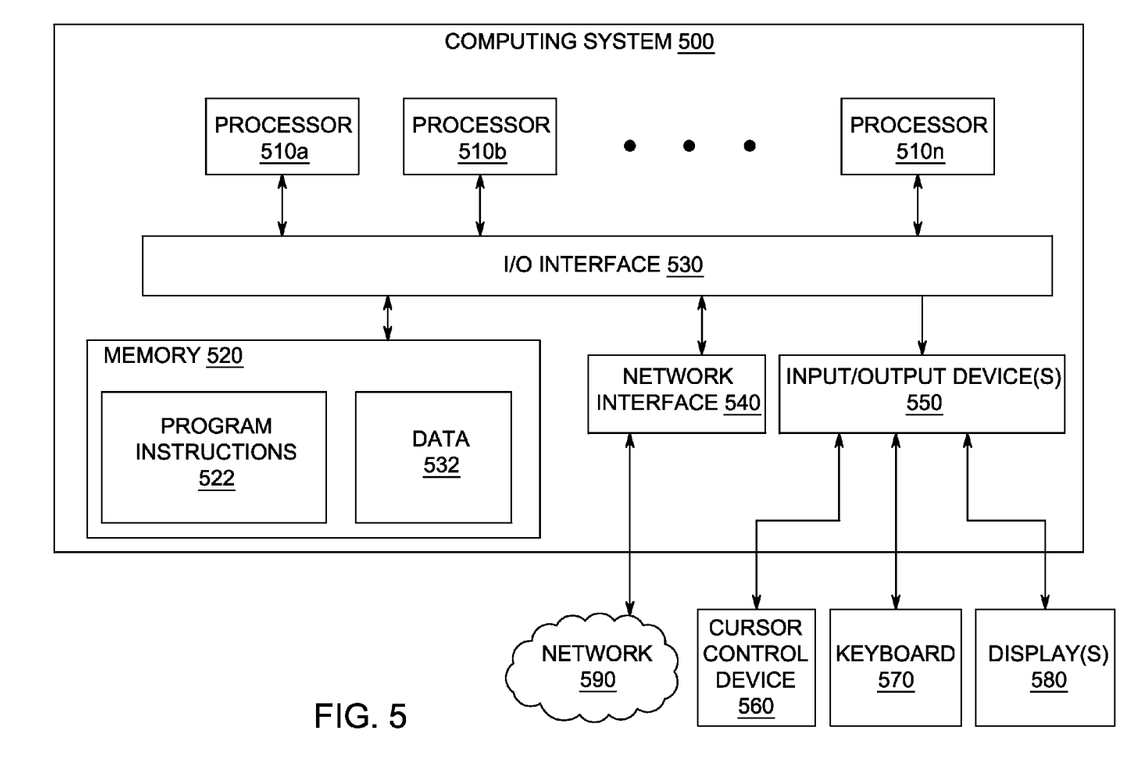
FIG. 5 depicts a computer system that can be utilized in various embodiments of the present invention, according to one or more embodiments.

FIG. 5 depicts a computer system that is a tablet with a touch screen can be utilized in various embodiments of the present invention, according to one or more embodiments.

Various embodiments of an apparatus and method for providing comb text field inputs at a mobile device, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement methods 200, as processor-executable executable program instructions 522 (e.g., program instructions executable by processor(s) 510a-n) in various embodiments.

In the illustrated embodiment, computer system 500 includes one or more processors 510a-n coupled to a system memory 520 via an input/output (I/O) interface 530. The computer system 500 further includes a network interface 540 coupled to I/O interface 530, and one or more input/output devices 550, such as cursor control device 560, keyboard 570, and display(s) 580. In various embodiments, any of components may be utilized by the system to receive user input described above. In various embodiments, a user interface (e.g., user interface) may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510a-n may be any suitable processor capable of executing instructions. For example, in various embodiments processors 510 may be general-purpose or embedded processors implementing any of a variety of instruction set architectures (ISAs), such as the x96, PowerPC, SPARC, or MIPS ISAs, or any other suitable ISA. In multiprocessor systems, each of processors 510a-n may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one components (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the methods illustrated by the flowchart of FIG. 2. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method for controlling stroke rendering on a touch screen, the method comprising:
   receiving indicia of pressure on a touch screen from a touch applied to the touch screen, where the pressure indicia represents an amount of force applied to the touch screen as the touch moves across a surface of the touch screen;
   iteratively computing, as the touch moves across the touch screen, a dot size as a summation of a minimum dot size and a pressure-based dot size increase, the pressure-based dot size increase corresponding to a difference between a current pressure indicia and a minimum pressure multiplied by a ratio of a maximum dot size to a maximum pressure; and
   rendering a newly created stroke on the touch screen along a path of the touch across the touch screen using the dot size computed during an immediately preceding iteration, wherein as the stroke is formed, the pressure indicia is computed and the stroke width is dynamically adjusted as the pressure indicia changes.

2. The method of claim 1, further comprising generating a touch event in response to the touch, and reading the touch event to access the indicia of pressure therefrom.

3. The method of claim 1, wherein computing the dot size during an iteration uses the minimum and the maximum dot size, and the minimum and the maximum pressure, a current dot size, and a current pressure.

4. The method of claim 3, further comprising dynamically controlling changes in the dot size based on changes in the pressure indicia.

5. The method of claim 1, wherein rendering includes rendering each dot as a contact location on the touch screen changes, where a plurality of rendered dots form the newly created stroke having a varying width.

6. The method of claim 1, further comprising smoothing the created stroke.

7. The method of claim 6, further comprising smoothing the created stroke such that the change in the created stroke from an initial point based on an initial pressure to a second point based on a second pressure comprises a plurality dot size changes.

8. An apparatus for controlling stroke rendering on a touch screen, the apparatus comprising:
   a touch screen;
   at least one processor,
   a non-transitory storage medium having computer readable instructions stored thereon that when executed by the at least one processor cause the apparatus to:
   generate a touch event in response to a force from a touch being applied to a touch screen;
   calculate, from the touch event, an indicia of pressure of the force applied to the touch screen as the touch moves across a surface of the touch screen;
   iteratively compute, as the touch moves across the touch screen, a dot size as a summation of a minimum dot size and a pressure-based dot size increase, the pressure-based dot size increase corresponding to a difference between a current pressure indicia and a minimum pressure multiplied by a ratio of a maximum dot size to a maximum pressure; and
   render a newly created stroke on the touch screen along a path of the touch across the touch screen using the dot size computed during an immediately preceding iteration, wherein as the stroke is formed, the pressure indicia is computed and the stroke width is dynamically adjusted as the pressure indicia changes.

9. The apparatus of claim 8, wherein the touch screen is pressure sensitive and the pressure indicia represents an amount of the force applied to the touch screen.

10. The apparatus of claim 8, wherein the computer readable instructions, when executed by the at least one processor, cause the apparatus to generate a plurality of touch events in response to a contact location of the force moving across the touch screen.

11. The apparatus of claim 8, wherein the computer readable instructions are at least one of a component of, a plug in and an extension for, an operating system of the apparatus.

12. The apparatus of claim 8, wherein the computer readable instructions, when executed by the at least one processor, cause the apparatus render the newly created stroke in response to generation of the touch event.

13. The apparatus of claim 8, wherein the computer readable instructions, when executed by the at least one processor, cause the apparatus to dynamically control changes in the dot size based on changes in the pressure indicia.

14. The apparatus of claim 13, wherein computing the dot size uses the minimum and the maximum dot size, and the minimum and the maximum pressure, a current dot size, and a current pressure.

15. The apparatus of claim 8, wherein the computer readable instructions, when executed by the at least one processor, cause the apparatus to interactively compute the dot size and render each dot as a contact location on the touch screen changes, where a plurality of rendered dots form the newly created stroke having a variable width.

16. A non-transitory computer readable medium for storing executable code that, when executed by a processor, causes the processor to perform a method for controlling stroke rendering on a touch screen, the method comprising:
   receiving indicia of pressure on a touch screen from a touch applied to the touch screen, where the pressure indicia represents an amount of force applied to the touch screen as the touch moves across a surface of the touch screen;
   iteratively computing, as the touch moves across the touch screen, a dot size as a summation of a minimum dot size and a pressure-based dot size increase, the pressure-based dot size increase corresponding to a difference between a current pressure indicia and a minimum pressure multiplied by a ratio of a maximum dot size to a maximum pressure; and rendering a newly created stroke on the touch screen along a path of the touch across the touch screen using the dot size computed during an immediately preceding iteration, wherein as the stroke is formed, the pressure indicia is computed and the stroke width is dynamically adjusted as the pressure indicia changes.

17. The non-transitory computer readable medium of claim 16, wherein the method further comprises generating a touch event in response to the touch, and reading the touch event to access the indicia of pressure therefrom.

18. The non-transitory computer readable medium of claim 16, wherein the method further comprises dynamically controlling changes in the dot size based on changes in the pressure indicia.

\* \* \* \* \*